United States Patent [19]

King

[11] 4,112,811
[45] Sep. 12, 1978

[54] SELF-DIMPLING FASTENER PIN

[76] Inventor: John Olmsted King, 3990 N. Ivy Rd., Atlanta, Ga. 30342

[21] Appl. No.: 787,758

[22] Filed: Apr. 15, 1977

[51] Int. Cl.² ............................................. F16B 19/08
[52] U.S. Cl. .......................................... 85/7; 72/391; 85/37; 85/72; 85/77
[58] Field of Search .................. 85/72, 77, 37, 1 P, 85/5 R, 7; 151/41.73; 29/243.53, 243.54; 72/391

[56] References Cited

U.S. PATENT DOCUMENTS

| | | | |
|---|---|---|---|
| 2,531,049 | 11/1950 | Huck | 85/37 |
| 3,057,246 | 10/1962 | Brilmyer | 85/37 |
| 3,452,638 | 7/1969 | Lauer | 85/37 |
| 4,054,045 | 10/1977 | King | 85/1 P |

FOREIGN PATENT DOCUMENTS

544,603  4/1942  United Kingdom ..................... 72/352

Primary Examiner—Milton S. Mehr
Assistant Examiner—Gene P. Crosby

Attorney, Agent, or Firm—B. J. Powell

[57] ABSTRACT

A self-dimpling fastener pin for use in forming dimpled fastener joints connecting thin sheets of material including a shank; a head integral with one end of the shank; and, a pintail integral with the opposite end of the shank with the shank, head and pintail coaxial with each other and concentric about the pin central axis. The head defines a tapered head bearing surface on the underside thereof facing the shank and having a size and shape corresponding to the desired size and shape of the dimple in the sheets of material when installation of the fastener pin is complete. The shank defines a shank bearing surface thereon which may be smooth or grooved to support the sheets of material. The pintail is adapted to be gripped to pull the fastener pin into the holes through the sheets of material, pintail first, to install the fastener pin and form the dimple through a dimple bending surface on the shank of the fastener pin. A collar is used if the shank is smooth but may be eliminated if the shank is grooved since the sheets lock the fastener pin in place.

6 Claims, 18 Drawing Figures

SELF-DIMPLING FASTENER PIN

BACKGROUND OF THE INVENTION

This invention relates generally to the formation of fastener joints where the thin sheets of material are dimpled and more particularly to a fastener system which automatically dimples the thin sheets of material as an incident to the installation of the fastener in the joint.

Where thin sheets of material are to be fastened together by fasteners, it is common practice to dimple the sheets of material around the holes through which the fastener is installed to enhance the strength of the fastener joint. Usually, the formation of such fastener joints involves drilling pilot holes through the sheets of material where the joint is to be made and then forming a dimple in the sheets around the pilot holes with special tooling. After dimpling, the holes are redrilled to a larger diameter to remove the uneven edges of the sheets of material at the hole formed as an incident to the dimpling operation so that the hole through the sheets of material is smooth with a constant diameter. Finally, the fastener is installed in the thusly formed hole to complete the fastener joint. As is apparent, the number of steps involved in this technique make some relatively expensive to carry out and also increase the incidence of error in connection therewith. Further, the number of fabrication steps involved and the equipment required to carry out this technique make field repair of these dimpled joints difficult and expensive, especially where a new sheet of material is added to the joint.

SUMMARY OF THE INVENTION

These and other problems and disadvantages associated with the prior art are overcome by the invention disclosed herein by providing a dimpled fastener joint connecting thin sheets of material in which the dimples in the sheets of material are formed as an incident to the installation of the fastener thereby minimizing the number of steps required to fabricate the joint as well as simplifying the installation tools therefor. This minimizes the installation time and cost. The invention also provides easy field repair of dimpled fastener joints.

According to one aspect of the invention, there is provided a fastener pin comprising a shank, a head integral with one end of the shank, and a pintail integral with the opposite end of the shank with the head, shank and pintail coaxial with each other and concentric about the pin central axis. The head defines a tapered head bearing surface on the underside thereof facing the shank concentric about the pin central axis and having a size and shape corresponding to the desired size and shape of the dimple in the sheets of material when installation of the fastener pin is complete. The shank defines a shank bearing surface thereon which joins with the head bearing surface where the shank bearing surface is concentric about the pin central axis and has a minimum outside diameter larger than the initial hole diameter and corresponds to the diameter of the holes through the sheets of material when installation of the fastener pin is complete. The pintail defines a gripping surface thereon adapted to be gripped to pull the fastener pin into the holes through the sheets of material, pintail first, with the pintail having a maximum outside gripping diameter smaller than the initial hole diameter so that the gripping surface on the pintail will slidably pass through the holes in the sheets of material prior to the formation of the dimple. The fastener pin further defines at least one tapered dimple bending surface thereon facing and trailing the gripping surface on the pintail but leading the shank bearing surface where the simple bending surface has a size and shape such that the dimple bending surface will bend the sheets of material to form the dimple therein as the fastener pin is pulled into the holes, pintail first, until the head bearing surface is in bearing contact with the sheets of material in the thusly bent dimple.

One embodiment of the fastener pin has a cylindrical bearing surface and a collar locking surface on the shank so that a locking collar can be swaged onto the locking surface to hold the joint together. Another embodiment of the fastener pin has sheet locking grooves formed in the bearing surface on the shank so that the dimple in each sheet of material fits into one of the sheet locking grooves to hold the joint together. The swagable collar embodiment of the fastener pin is installed with a single motion installation gun where the collar acts to back up the sheets of material during the dimple forming operation or a double motion installation gun where the collar does not back up the sheets of material during the dimple forming operation. The sheet locking groove embodiment of the fastener pin is installed with a dual motion installation gun where the first motion pulls the fastener pin into the sheets of material and the second motion reforms the sheets of material around the shank of the fastener pin to lock the sheets of material into the sheet locking grooves and finally form the dimple in the sheets of material. The invention contemplates both the method of installing the fastener and the installation tooling therefor.

These and other features and advantages of the invention will become more clearly understood on consideration of the following description and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the figures, it will be seen that the invention is incorporated in a fastener pin and an installation tool for installing the fastener pin in thin sheets of material to form dimples in the sheets of material as an incident to the fastener installation. The invention may also incorporate a swagable collar to lock the fastener pin in the sheets of material.

This invention is directed to the formation of dimpled fastener joints DJ (FIGS. 7, 14 and 18) in thin sheets S of material, usually metal. These joints DJ are made by dimpling the sheets S around aligned pilot holes PH of an initial diameter $D_I$ through sheets S from their initial flat condition (FIGS. 4, 8, 10 and 15) to form a dimple D (FIGS. 7, 14 and 18) that receives the countersunk style head of the fastener pin therein. Thus, each of the sheets S has a dimple flange DF that angles away from the sheet plane SP at an angle which corresponds to the angle of the countersunk bearing surface on the head of the fastener pin (FIGS. 7, 14 and 18) where the dimple flanges DF nest within each other about the fastener pin. These dimpled joints DJ are usually used where the sheets S are so thin that it is difficult to carry the joint load in fastener holes which extend through the sheets when they are flat. The joints DJ are usually found in the final skin sheets of aircraft, trailer bodies and the like, and may be aluminum, steel, or other metals. The thickness of the sheets S which have dimpled joints DJ may vary, but usually the sheets S are in a thickness range of 0.010–0.100 inch (0.254–2.54 mm).

Figure 1:
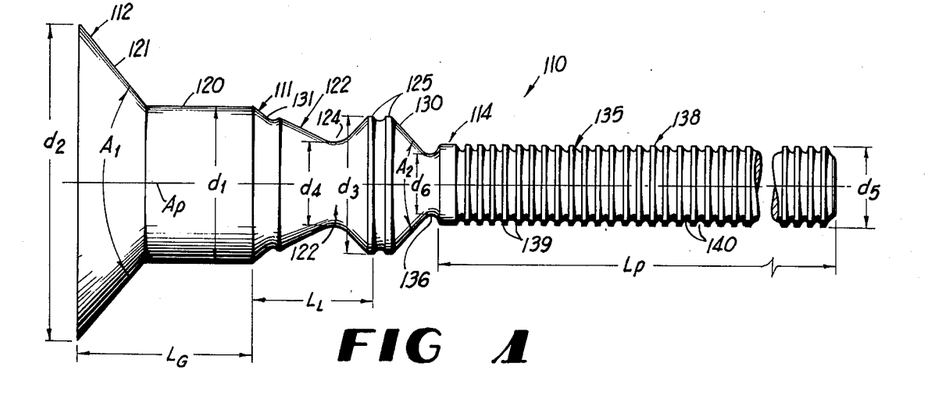
FIG. 1 is a side elevational view of a first embodiment of the fastener pin of the invention.
Figure 2:
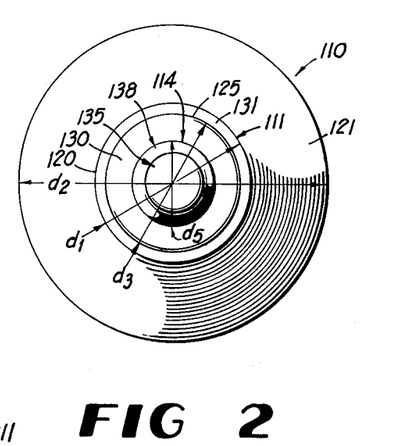
FIG. 2 is a right hand end view of the fastener pin of FIG. 1.
Figure 3:
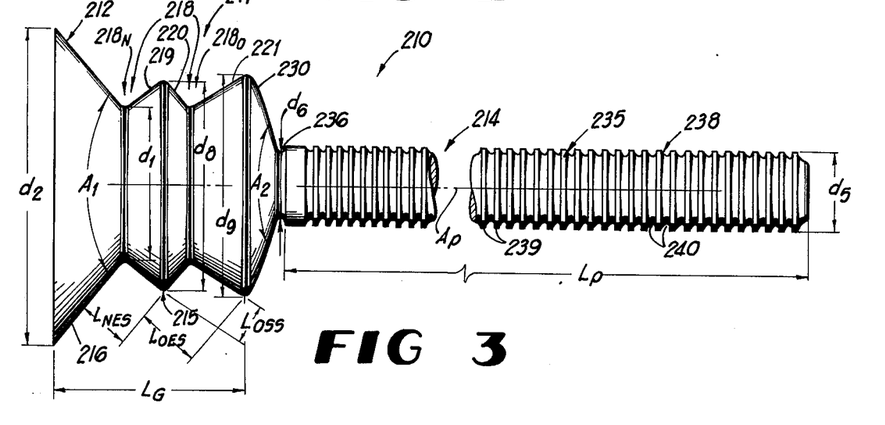
FIG. 3 is a side elevational view of a second embodiment of the fastener pin of the invention.

Turning now more specifically to the embodiments of the invention described herein, it will be seen that a first embodiment of the fastener pin 110 is shown in FIGS. 1 and 2 which is designed for use with a swagable collar. A second embodiment of the fastener pin 210 is shown in FIG. 3 which is designed for use without a collar and which uses the dimple flanges DF to lock the fastener pin in place. The fastener pin 110 is illustrated being installed with a first embodiment of the installation tool 310 and a first embodiment of the swagable collar 410 in FIGS. 4–9. The fastener pin 110 is illustrated being installed with a second embodiment of the installation tool 510 and a second embodiment of the swagable collar 610 in FIGS. 10–14. The fastener pin 210 is illustrated being installed with a third embodiment of the installation tool 710 in FIGS. 15–18.

For sake of convenience, the leading end of each component of the invention will be considered that end of the component which moves toward or through the sheets S first. The opposite end of each will be considered the trailing end.

COLLAR FASTENER PIN

Referring to FIGS. 1 and 2, the fastener pin 110 includes a shank 111, a head 112 integral with the trailing end of shank 111, and a pintail 114 integral with the leading end of shank 111, all being coaxially aligned along and concentric about the pin central axis $A_p$. The shank 111 defines a cylindrical shank bearing surface 120 thereon adjacent the trailing end thereof of a substantially constant working diameter $d_1$ along the length of surface 120. The working diameter $d_1$ would correspond to that of a conventional fastener pin and is the size by which the fastener pin 110 is identified as set by fastener art convention. The head 112 defines a countersunk head bearing surface 121 on the leading underside thereof which tapers outwardly from the trailing end of shank bearing surface 120 to a head diameter $d_2$ at its trailing end. The taper on head bearing surface 121 corresponds to that usually associated with countersunk fastener pins with an included angle $A_1$, illustrated as 100°. The diameter $d_2$ corresponds to the head diameter normally associated with tension type fasteners and is illustrated as about twice the bearing diameter $d_1$. The grip length LG of fastener pin 110 is the distance from the trailing end of head 112 to the leading end of shank bearing surface 120. While grip length LG varies with the combined thickness of sheets S, it is illustrated at about 1.15 times diameter $d_1$.

The shank 111 also defines a collar locking surface 122 thereon leading the shank bearing surface 120 onto which one of the collars is swaged to lock the fastener pin in position. Collar locking surface 122 has a major locking groove 124 therein with lands 125 and corresponds generally in configuration to that of a conventional shear type lockbolt. The lands 125 usually have a diameter $d_3$ slightly less than the shank bearing diameter $d_1$ while the groove 124 has a minimum diameter $d_4$ larger than the minimum diameter of fastener pin 110 as will become apparent but sufficiently smaller than load diameter $d_3$ to assure that the collar will be retained thereon after swaging. The collar locking surface 122 has a length $L_L$ which corresponds generally to that associated with a conventional shear type lockbolt.

The leading end of shank 111 defines a primary dimple bending surface 130 thereon which tapers inwardly from the leading end of collar locking surface 122 at land 125 larger than initial pilot hole diameter $D_I$ down to the diameter of pintail 114 as will become more apparent smaller than the initial pilot hole diameter $D_I$. Thus, surface 130 has an included angle $A_2$. The dimple bend angle $A_2$ is selected so that surface 130 will bend the sheets S around pilot holes PH to form the dimple flanges DF as will become apparent and is illustrated at about 90°. A tapered secondary dimple bending surface 131 is defined on the shank 111 immediately leading the shank bearing surface 120. The secondary surface 131 serves to finally bend the dimple flanges DF out to the shank bearing diameter $d_1$ as will become apparent. The secondary surface 131 is illustrated as forming part of the locking groove 124 on locking surface 122.

The pintail 114 has a gripping section 135 on the leading portion thereof and a breakneck section 136 on the trailing end thereof which connects the trailing end of gripping section 135 to the leading end of shank 111 at the primary dimple bending surface 130. The gripping section 135 defines a conventional pintail gripping surface 138 thereon illustrated as alternating lands 139 and grooves 140. The gripping surface 138 has an outside diameter $d_5$ smaller than the initial pilot hole diameter $D_I$ so that section 135 will pass therethrough as will become more apparent. For convenience, the outside pintail diameter will usually correspond to the pintail diameter of a smaller size conventional lockbolt than that of the shank bearing diameter $d_1$. It is expected that that pintail diameter $d_5$ will correspond to that of the pintail of the next lower size conventional lockbolt. The breakneck section 136 has a minimum breakneck diameter $d_6$ which corresponds generally to that associated with the same size pintail on a conventional lockbolt. The breakneck diameter $d_6$ is the smallest diameter on the fastener pin 110 so that the breakneck section 136 will fracture to separate the pintail 114 from the shank 111 and head 112 upon installation of fastener pin 110 as is well understood in the lockbolt installation art. The gripping section 135 has a convenient length $L_P$ corresponding to that of the same size conventional lockbolt.

COLLARLESS FASTENER PIN

Referring to FIG. 3, the fastener pin 210 includes a shank 211, a head 212 integral with the trailing end of shank 211, and a pintail 214 integral with the leading end of shank 211, all being coaxially aligned along and concentric about the pin central axis $A_P$. The shank 211 defines a shank bearing surface 215 thereon while the head 212 defines a countersunk head bearing surface 216 on the leading underside thereof which tapers outwardly from the trailing end of shank bearing surface 215 to a head diameter $d_2$ at its trailing end. The taper on head bearing surface 216 corresponds to that usually associated with countersunk fastener pins with an included angle $A_1$, illustrated as 100°. The diameter $d_2$ corresponds to the head diameter normally associated with tension type fasteners and is illustrated as about twice the diameter of the shank bearing surface 215. The shank bearing surface 215 defines a plurality of axially spaced, circumferentially extending sheet locking grooves 218 therein which use the sheets S to lock the fastener pin 210 therein as will become more apparent. One sheet locking groove 218 is provided for each sheet S in the dimpled joint DJ with the fastener pin 210 illustrated being designed for use in a dimpled joint having two sheets S since it has two sheet locking grooves 218. It is to be understood, however, that any practical number of grooves 218 may be provided for a like number of sheets S in the joint. That sheet locking groove $218_N$ adjacent the head 212 is defined between the head bearing surface 216 and a tapered sheet end subsurface 219 which joins with the leading end of head bearing surface 216 with minor shank bearing diameter $d_1$ and extends outwardly therefrom generally normal to head bearing surface 216 to a first major shank bearing diameter $d_8$. The sheet end subsurface 219 has a length $L_{NES}$ corresponding to the thickness $t_{NS}$ of the near side sheet $S_N$ which the head 212 of fastener pin 210 engages as will become more apparent. That sheet locking groove $218_o$ which receives the offside sheet $S_o$ is defined on one side by a tapered sheet side subsurface 220 that joins with the forward end of sheet end subsurface 219 of near groove $218_N$ and extends inwardly therefrom generally normal thereto and parallel to head bearing surface 216 back to the minor shank bearing diameter $d_1$. The sheet side subsurface 220 has a length $L_{OSS}$ corresponding to the distance the dimple flange DF of the offside sheet $S_o$ projects inwardly past the end of the dimple flange DF of the near side sheet $S_N$ as will become more apparent. The other side of the sheet locking groove $218_o$ is defined by an offside tapered sheet end subsurface 221 which corresponds generally to the sheet end subsurface 219. The sheet end subsurface 221 joins with the leading end of the sheet side subsurface 220 and extends outwardly therefrom generally normal thereto and generally parallel to the near side sheet end subsurface 219 back to a second major shank bearing diameter $d_9$. The offside sheet end subsurface 221 has a length $L_{OES}$ at least as great as the thickness $t_{os}$ of the offside sheet $S_o$ and usually slightly greater as will become apparent. Additional sheet locking grooves 218 would have similar constructions. The grip length LG of fastener pin 210 is the distance from the trailing end of head 212 to the leading end of shank bearing surface 215. While grip length LG varies with the combined thickness of sheets S, it is illustrated at about 1.15 times diameter $d_1$.

The leading end of shank 211 defines a dimple bending surface 230 thereon which tapers inwardly from the leading end of shank bearing surface 215 larger than initial pilot hole diameter $D_I$ down to the diameter of pintail 214 smaller than the initial pilot hole diameter $D_I$. Thus, surface 230 has an inclined angle $A_2$. The dimple bend angle $A_2$ is selected so that surface 230 will bend the sheets S around pilot holes PH to form the dimple flanges DF as will become apparent and is illustrated at about 150°.

The pintail 214 has a construction similar to that of pintail 114 with a gripping section 235 of length $L_P$ and diameter $d_5$ and breakneck section 236 of diameter $d_6$. The pintail gripping surface 238 on section 235 has lands 239 and grooves 240. The dimensions of pintail 214 correspond to those of pintail 114.

SINGLE MOTION COLLAR

The first embodiment of the swagable collar 410 is illustrated in FIGS. 4–9 with a collar central axis $A_C$. The collar 410 is designed for use with the single motion tool 310 on the fastener pin 110 as will become more apparent. The collar 410 has an annular side wall 411 which defines an initial pin passage 412 therethrough concentric about collar axis $A_C$ of initial inside diameter $d_{10}$ seen in FIG. 4 with a dimple clearance counterbore 414 at the leading sheet bearing end 415 thereof of initial inside diameter $d_{11}$ also seen in FIG. 4. The pin passage inside diameter $d_{10}$ is selected to clear both the pintail 115 and the lands 125 in the collar surface 122 on fastener pin 110 as will become more apparent and is usually about equal to the land diameter $d_3$ on fastener pin 110. The counterbore inside diameter $d_{11}$ is selected to clear the inboard end of the dimple flange DF on the offside sheet $S_o$ as will become more apparent. The main portion of the collar side wall 411 has a nominal diameter $d_{12}$ such that it will work with tool 310 as will become apparent while at the same time providing a sufficient volume of metal in the collar 110 for swaging. The trailing driven end 416 of side wall 411 may be provided with a driving bead 418 around its outside edge as is common in swagable collars for lockbolts.

Figure 4:
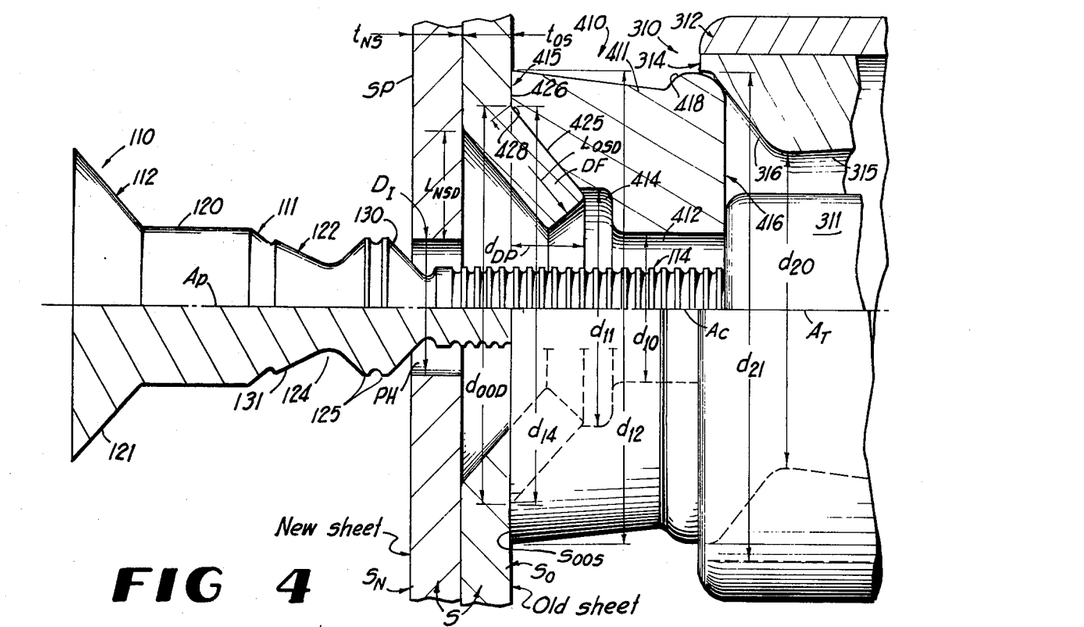
FIG. 4 is a longitudinal cross-sectional view showing the first embodiment of the fastener pin of FIGS. 1 and 2 ready for installation in a repair application using a first embodiment of the installation tool.

The leading end 415 of collar side wall 412 defines an annular tapered dimple bearing surface 425 thereon which extends forwardly and outwardly from diameter $d_{11}$ at counterbore 414 to outside diameter $d_{14}$ that is substantially equal to the outside dimple diameter $d_{OOD}$ at the juncture of dimple flange DF on offside sheet $S_o$ with the flat part of the sheet at the offside surface $S_{OOS}$ of sheet $S_o$ best seen in FIG. 4. The dimple bearing surface 425 has an included angle about equal to the angle $A_1$ of the head bearing surface 121 on fastener pin 110 as will become apparent. The leading end 415 of collar side wall 412 also defines an annular sheet bearing surface 426 thereon normal to collar axis $A_C$ which extends outwardly from dimple bearing surface 425 at diameter $d_{14}$ to the outside side wall diameter $d_{12}$ to form a shoulder 428 between surfaces 425 and 426. The shoulder 428 serves to limit the bending of sheet $S_o$ to that portion of the sheet between shoulder 428 and the pilot holes PH as will become apparent. Thus, when the collar 410 is forced against the offside surface $S_{OOS}$ of sheet $S_o$ as seen in FIGS. 4, 5, 8 and 9, the sheet bearing surface 426 supports the flat part of the sheet $S_o$ outboard of dimple flange DF while the dimple bearing surface 425 supports the dimple flange DF of sheet $S_o$ after it is fully formed to act as a back up for the fastener pin 110.

In the installation of collar 410, it will be seen that tool 310 forces collar side wall 411 toward the offside sheet $S_o$ while the tool 310 pulls the fastener pin 110 into the sheets S, pintail end first, from the near side sheet $S_N$. This action does not exceed the collar swaging force threshold as is well understood in the lockbolt art. When head 112 on the fastener pin 110 is seated against the dimple flange DF on the near side sheet $S_N$, the swaging force threshold is exceeded and the collar 410 is swaged down to a minor swaged collar outside diameter $d_{15}$ seen in FIG. 7 to force the collar side wall 411 into gripping contact with the collar locking surface 122 on the shank 111 of fastener pin 110 to lock collar 410 thereon. This swaging operation also forms a swaged dimple flange 430 in the collar side wall 411 behind the dimple flange DF in the offside sheet $S_o$ to provide a back up for fastener head 112 and maintain the sheets clamped together at the dimple D.

SINGLE MOTION COLLAR TOOL

Figure 5:
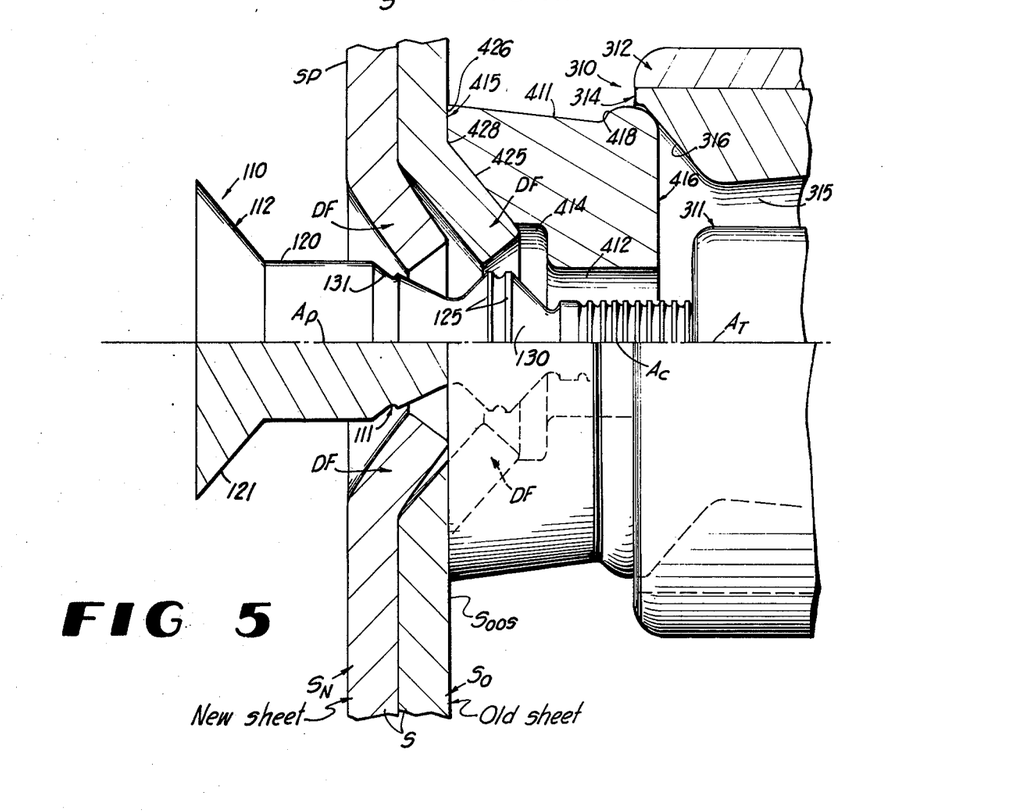
FIG. 5 is a view similar to FIG. 4 showing the fastener pin being pulled into the sheets of material.
Figure 6:
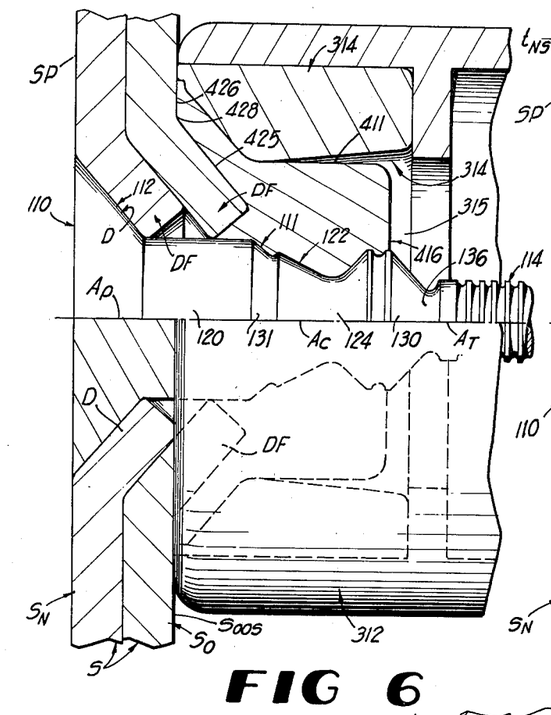
FIG. 6 is a view similar to FIG. 5 showing the collar of the invention swaged onto the fastener pin to form the dimple.
Figure 7:
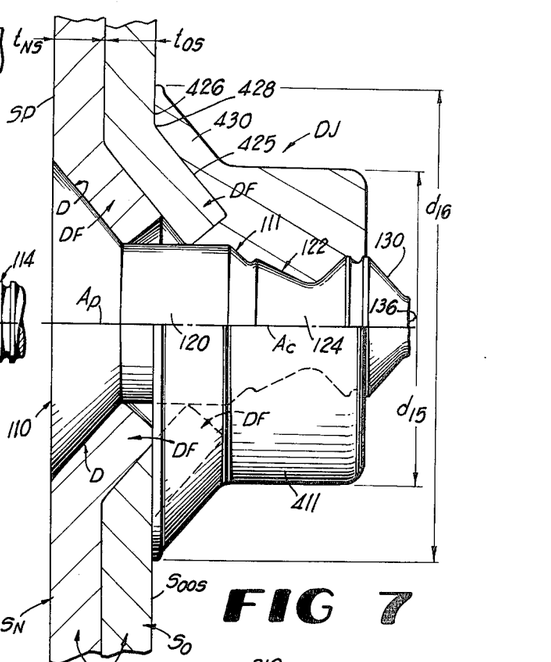
FIG. 7 is a view similar to FIG. 6 showing the fastener joint completed.

The single motion collar installation tool 310 is illustrated in FIGS. 4-6, 8 and 9 in use with the collar 410. The tool 310 has a working central axis $A_T$ and is adapted to be operated by a conventional lockbolt installation gun such as that illustrated by U.S. Pat. No. 3,039,270 where tool 310 replaces the conventional nose assembly associated therewith. The tool 310 has a conventional gripping jaw assembly 311 which is partly shown in FIGS. 4, 5, 8 and 9 and acts to selectively grip the pintail 115 of fastener pin 110 in conventional manner to pull the fastener pin 110 into the sheets S as is well known in the lockbolt art when the jaw assembly 311 is reciprocally moved along the tool working axis $A_T$. The tool 310 also has a nosepiece 312 in which the jaw assembly 311 is movably carried. The nosepiece 312 mounts a collar swaging anvil 314 therein at the leading end thereof which is fixed with respect to the nosepiece. The collar swaging anvil 314 has a general configuration corresponding to that associated with conventional swaging anvils for use with lockbolts. The swaging anvil 314 defines a central collar passage 315 therethrough of minimum diameter $d_{20}$ at its leading end which is equal to the minor swaged collar diameter $d_{15}$ when installation is complete as seen in FIG. 7. The anvil 314 defines an annular tapered swaging surface 316 on the leading end thereof which extends forwardly and outwardly from passage 315 at diameter $d_{20}$ to a maximum diameter $d_{21}$ equal to the major swaged diameter $d_{16}$ of collar 410 as seen in FIG. 7. The swaging surface 316 is complimentary in shape to the desired swaged shape of the swaged dimple flange 430 on collar 410 between its minor and major diameters $d_{15}$ and $d_{16}$ as seen in FIG. 7 when installation is complete.

DUAL MOTION COLLAR

The second embodiment of collar 610 is illustrated in FIGS. 10-14 and is designed for use with the dual motion installation tool 510. The collar 610 has a collar central axis $A_c$ and an annular side wall 611 which defines an initial pin passage 612 therethrough concentric about collar axis $A_c$ of initial inside diameter $d_{10}$ seen in FIG. 10 with a dimple clearance counterbore 614 at the leading sheet bearing end 615 thereof of initial inside diameter $d_{11}$ also seen in FIG. 10. The pin passage inside diameter $d_{10}$ is selected to clear both the pintail 115 and the lands 125 in the collar locking surface 122 on fastener pin 110 as will become more apparent and is usually about equal to the land diameter $d_3$ on fastener pin 110. The counterbore inside diameter $d_{11}$ is selected to clear the inboard end of the dimple flange DF on the offside sheet $S_o$ as will become apparent. The main portion of the collar side wall 611 has a nominal outside diameter $d_{12}$ such that it will work with tool 510 as will become more apparent while at the same time providing a sufficient volume of metal in the collar 610 for swaging. The trailing driven end 616 of side wall 611 may be provided with a driving bead 618 around its outside edge as is common in swagable collars for lockbolts.

Figure 12:
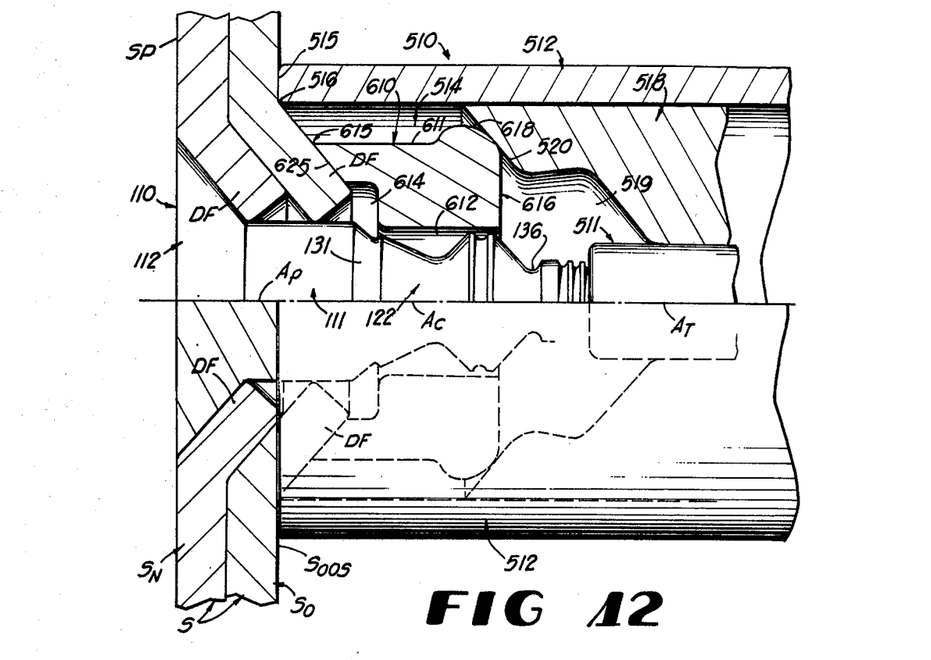
FIG. 12 is a view similar to FIG. 11 showing the final formation of the dimple in the sheets of material.

The leading end 615 of collar side wall 612 defines an annular tapered dimple bearing surface 625 thereon which extends forwardly and outwardly from diameter $d_{11}$ at counterbore 614 to the outside diameter $d_{12}$ of side wall 611 which is less than the outside dimple diameter $d_{OOD}$ at the juncture of dimple flange DF on offside sheet $S_o$ with the flat part of the sheet at the offside surface $S_{OOS}$ of sheet $S_o$ best seen in FIG. 12. The dimple bearing surface 625 has an included angle about equal to the angle $A_1$ of the head bearing surface 121 on fastener pin 110 as will become apparent. Thus, when the collar 610 is forced against the offside surface $S_{OOS}$ of sheet $S_o$ as seen in FIG. 12, the dimple bearing surface 625 supports the dimple flange DF of sheet $S_o$ after it is fully formed to act as a back up for the fastener pin 110.

DUAL MOTION COLLAR TOOL

The dual motion collar installation tool 510 is illustrated in FIGS. 10-13 in use with the collar 610. The tool 510 has a working central axis $A_T$ and is adapted to be operated by conventional locking rivet installation gun such as that illustrated by U.S. Pat. No. 3,309,911 where tool 510 replaces the conventional pulling head associated therewith. The tool 510 has a conventional gripping jaw assembly 511 which is partly shown in FIGS. 10-12 and acts to selectively grip the pintail 115 of fastener pin 110 in conventional manner to pull the fastener pin 110 into the sheets S as is well known in the lockbolt art when the jaw assembly 511 is reciprocally moved along the tool working axis $A_T$. The tool 510 also has a nosepiece 512 in which the jaw assembly 511 is movably carried. The nosepiece 512 defines an anvil passage 514 therein concentric about tool axis $A_T$. Anvil passage 514 has a diameter $d_{50}$ which is substantially equal to the outside dimple diameter $d_{OOD}$ at the juncture of dimple flange DF on offside sheet $S_o$ with the flat part of the sheet at the offside surface $S_{OOS}$ of sheet $S_o$ best seen in FIG. 10. The leading end of nosepiece 512 defines an annular sheet bearing surface 515 thereon normal to working axis $A_T$ which extends outwardly from passage 514 at diameter $d_{50}$ to form a shoulder 516 therebetween. The shoulder 516 serves to limit the bending of sheet $S_o$ to that portion of the sheet between shoulder 516 and the pilot holes PH as will become apparent. A collar swaging anvil 518 is reciprocally mounted in nosepiece passage 514 outboard of jaw assembly 511 and movable relative to nosepiece 512 along working axis $A_T$ independently of jaw assembly 511. The collar swaging anvil has a general configuration corresponding to that associated with conventional swaging anvils for use with lockbolts. The swaging anvil 518 defines a central collar passage 519 therethrough of minimum diameter $d_{51}$ at its leading end which is equal to the minor swaged collar diameter $d_{15}$ of collar 610 when installation is complete as seen in FIG. 14. The anvil 518 defines an annular tapered swaging surface 520 on the leading end thereof which extends forwardly and outwardly from collar passage 519 at diameter $d_{51}$ to a maximum diameter $d_{52}$ equal to the major swaged diameter $d_{16}$ of collar 610 as seen in FIG. 14. The swaging surface 520 is complimentary in shape to the desired swaged shape of the swaged dimple flange 630 on collar 610 between its minor and major diameters $d_{15}$ and $d_{16}$ as seen in FIG. 14 after swaging.

In the installation of the collar 610 using the tool 510, it will be seen that the sheet bearing surface 515 on nosepiece 512 is forced toward the offside sheet $S_o$ while the jaw assembly pulls the fastener pin 110 into the sheets S, pintail end first, from the near side sheet $S_N$. The anvil 518 is held in its retracted position during this motion. When head 112 on the fastener pin 110 is seated against the dimple flange DF on the near side sheet $S_N$, the anvil 518 is activated to force the collar 610 first into engagement with the dimple flange DF on the offside sheet $S_o$ to insure that the dimple flanges DF are properly formed. The swaging force threshhold of collar 610 is then exceeded to swage the side wall 611 down to a minor swaged collar outside diameter $d_{15}$ seen in FIG. 14 to force the collar side wall 611 into gripping contact with the collar locking surface 122 on the shank 111 of fastener pin 110 and lock collar 610 thereon. This swaging operation also forms a swaged dimple flanged 630 in the collar side wall 611 behind the dimple flange DF in the offside sheet $S_o$ to provide a back up for fastener head 112 and maintain the sheets clamped together at the dimple D.

DUAL MOTION COLLARLESS TOOL

Figure 15:
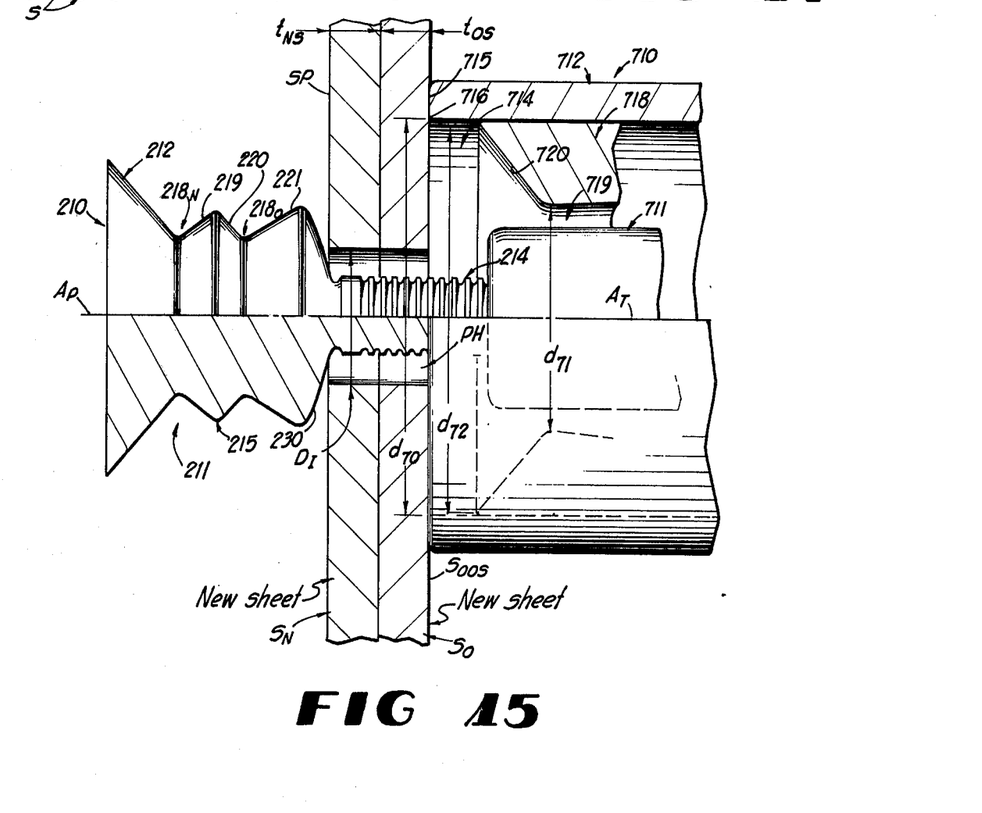
FIG. 15 is a longitudinal cross-sectional view showing the second embodiment of the fastener pin of FIG. 3 ready for installation.
Figure 16:
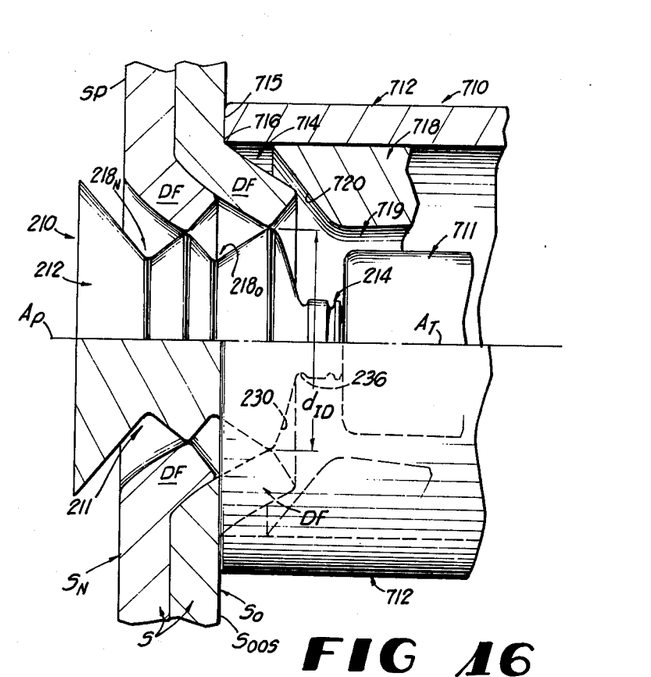
FIG. 16 is a view similar to FIG. 15 showing the fastener pin pulled into the sheets of material.
Figure 17:
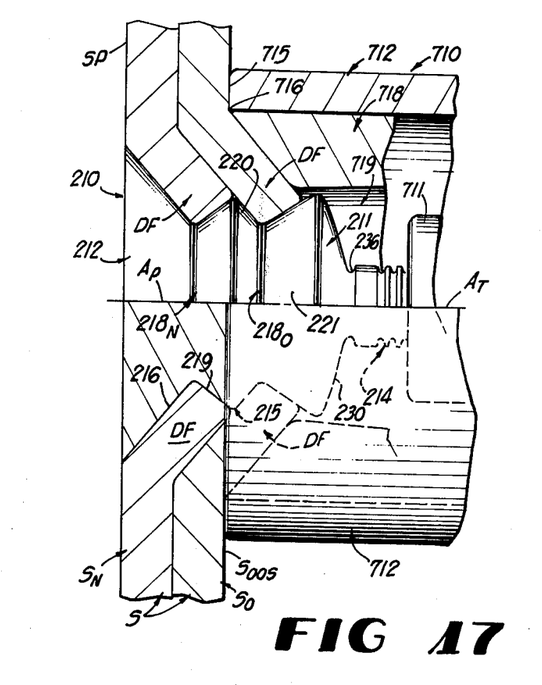
FIG. 17 is a view similar to FIG. 16 showing the dimple reformed into its final shape; and, FIG. 18 is a view similar to FIG. 17 showing the fastener joint completed.
Figure 18:
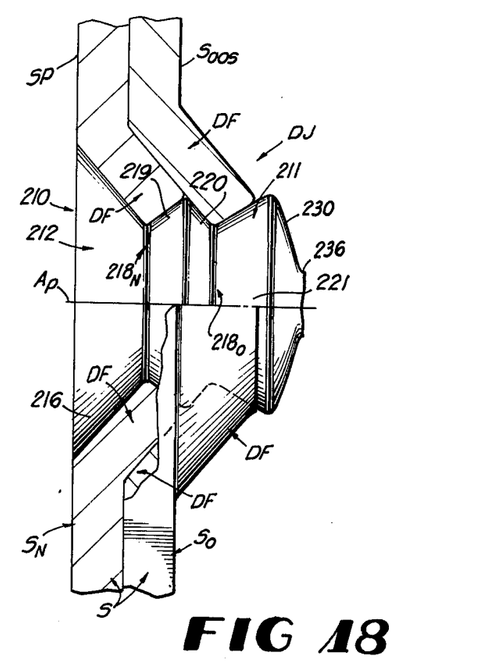

The dual motion collarless installation tool 710 is illustrated in FIGS. 15–17 for use with the sheet locking fastener pin 210. The tool 710 has a working central axis $A_T$ and is adapted to be operated by conventional locking rivet installation gun such as that illustrated by U.S. Pat. No. 3,309,911 where tool 710 replaces the conventional pulling head associated therewith. The tool 710 has a conventional gripping jaw assembly 711 which is partly shown in FIGS. 15–17 and acts to selectively grip the pintail 215 of fastener pin 210 in conventional manner to pull the fastener pin 210 into the sheets S as is well known in the lockbolt art when the jaw assembly 711 is reciprocally moved along the tool working axis $A_T$. The tool 710 also has a nosepiece 712 in which the jaw assembly 711 is movably carried. The nosepiece 712 defines an anvil passage 714 therein concentric about tool axis $A_T$. Anvil passage 714 has a diameter $d_{70}$ which is substantially equal to the outside dimple diameter $d_{OOD}$ at the juncture of dimple flange DF on offside sheet $S_o$ with the flat part of the sheet at the offside surface $S_{OOS}$ of sheet $S_o$ best seen in FIG. 15. The leading end of nosepiece 712 defines an annular sheet bearing surface 715 thereon normal to working axis $A_T$ which extends outwardly from passage 714 at diameter $d_{70}$ to form a shoulder 716 therebetween. The shoulder 716 serves to limit the bending of sheet $S_o$ to that portion of the sheet between shoulder 716 and the pilot holes PH as will become apparent. A dimple reforming anvil 718 is reciprocally mounted in nosepiece passage 714 outboard of jaw assembly 711 and movable relative to nosepiece 712 along working axis $A_T$ independently of jaw assembly 711. The dimple reforming anvil 718 has a general configuration corresponding to the offside surface $S_{OOS}$ of the dimple flange DF on the offside sheet $S_o$ when the joint DJ is complete as illustrated in FIG. 18. The dimple reforming anvil 718 defines a central pin clearing passage 719 therethrough of diameter $d_{71}$ which is sufficient to receive the second major shank diameter $d_9$ on the shank 211 of fastener pin 210 as will become apparent. The anvil 718 also defines an annular tapered reforming surface 720 on the leading end thereof which extends forwardly and outwardly from pin passage 719 to a maximum diameter $d_{72}$ about equal to the passage diameter $d_{70}$ in nosepiece 712 with an included angle about equal to that of the head bearing surface 216 on the fastener pin head 212. The reforming surface 720 thus has a complimentary shape to that which the offside surface $S_{OOS}$ on dimple flange DF of offside sheet $S_o$ is to have when installation is complete as seen in FIG. 18.

In the installation of the sheet locking pin 210 using the tool 710, it will be seen that the sheet bearing surface 715 on nosepiece 712 is forced toward the offside sheet $S_o$ while the jaw assembly pulls the fastener pin 210 into the sheets S, pintail end first, from the near side sheet $S_N$. This causes the dimple bending surface 231 on fastener pin shank 211 to bend the dimple flanges DF out to an intermediate diameter $d_{ID}$ about equal to the second major shank bearing diameter $d_9$ as seen in FIG. 16 so that the fastener pin shank 211 can pass into the sheets S and the head 212 can seat on the near side flange DF. When head 212 on the fastener pin 210 is seated against the dimple flange DF on the near side sheet $S_N$, the anvil 718 is activated to force the reforming surface 720 into engagement with the dimple flange DF on the offside sheet $S_o$ and bend flanges DF back to their final positions seen in FIG. 17. This forces the inside edges of flanges DF into their corresponding locking grooves 218 to fill same. Thus, the dimple flanges DF now lock the fastener pin 210 in place. When the breakneck section 236 is broken, the joint DJ is complete as seen in FIG. 18.

OPERATION

To better understand the operation of the invention, a particular size fastener pin will be given by way of example so that the other dimensions can be related thereto. By way of example, assume that the fastener pin 110 is a ⅛ inch fastener. The shank bearing surface diameter $d_1$ would be 0.125 inch (3.175 mm) as is standard for this size fastener. The head diameter $d_2$ would be about 0.250 inch (6.350 mm) while the land diameter $d_3$ would be about 0.120 inch (3.048 mm) and the major locking groove diameter $d_4$ would be about 0.101 inch (2.565 mm). The locking surface length would be about 0.135 inch (3.439 mm). The pintail diameter $d_5$ would be about 0.0915 inch (2.324 mm) and the breakneck groove diameter $d_6$ would be about 0.0715 inch (1.816 mm) while the pintail length $L_P$ would be about 1.5 inch (38.1 mm). The grip length $L_G$ would, of course, depend on the total thickness of the sheets S of material plus the amount the dimples D project therefrom. The particular sheet thicknesses $t_{NS}$ and $t_{OS}$ are both illustrated at about 0.0417 inch (1.058 mm) to give a total material thickness of about 0.0833 inch (2.117 mm). These thicknesses may vary from application to application but the anticipated sheet thickness range is expected to be about 0.010–0.100 inch (0.254–2.54 mm). Thus, the grip length $L_G$ illustrated is about 0.156 inch (3.962 mm) since the dimple D on the offside sheet $S_o$ projects a distance $d_{DP}$ (FIG. 4) about 0.0583 inch (1.482 mm) behind the offside sheet $S_o$ to give a total material thickness plus dimple projection of about 0.142 inch (3.598 mm). The sheet thickness $t_{NS}$ and $t_{OS}$ also affects the initial pilot hole diameter $D_I$. Generally speaking, the thicker the sheets S of material, the larger the required initial pilot hole diameter $D_I$. For the particular example illustrated, the initial pilot hole diameter $D_I$ should be about 0.100 inch (2.540 mm). This will produce an outside dimple diameter $d_{OOD}$ of about 0.313 inch (7.938 mm).

To cooperate with the fastener pin 110, the single motion collar 410 should have an outside dimple bearing surface diameter $d_{14}$ of about 0.313 inch (7.938 mm) to assure proper formation of the dimple D. The pin passage diameter $d_{10}$ should be about 0.130 inch (3.302 mm) to insure clearance of the lands 125 in locking surface 122. The counterbore diameter $d_{11}$ should be about 0.1875 inch (4.763 mm) to insure that the collar 410 initially clears the projecting most corner of the dimple DF on the offside sheet $S_o$ as seen in FIGS. 4 and 5. The outside diameter $d_{12}$ of the collar 410 is about 0.373 inch (9.472 mm) to insure good bearing of surface 426 against the sheet $S_o$.

To insure proper swaging of collar 410 the central collar passage 315 of anvil 314 has a minor diameter $d_{20}$ of about 0.200 inch (5.080 mm) which determines the final swaged diameter $d_{15}$ of the main body of the collar 14. The major diameter $d_{21}$ of the swaging surface 316 on the anvil 314 determines the final major swaged diameter $d_{16}$ of the collar 410 and is illustrated in FIGS. 4–9 as about 0.373 inch (9.472 mm).

FIGS. 4–7 illustrate the fastener 110, the single motion collar 410 and the single motion tool 310 being used in a repair operation where a new sheet of material (nearside sheet $S_N$) is being installed on an old sheet of material (offside sheet $S_o$) which has already been dimpled. The new sheet $S_N$ is in position and undimpled in FIG. 4. The pintail 114 has been inserted through pilot hole PH in new sheet $S_N$ and projects through the dimple flange DF in the old sheet $S_o$. The collar 410 is placed around pintail 114 so that the sheet bearing surface 426 engages the offside surface $S_{OOS}$ of the old sheet $S_o$. The anvil 314 in the single motion tool 310 is inserted over pintail 114 until the swaging surface 316 engages collar 410 and the gripping jaw assembly 311 engages pintail 114.

Upon activation of tool 310, the gripping jaw assembly 311 pulls the fastener 110 toward the tool 310 while the anvil 314 forces the collar 410 toward the sheet $S_o$. This pulls the primary dimple bending surface 130 into contact with the sheet $S_N$ about pilot hole PH and then causes surface 130 to bend sheet $S_N$ about the hole PH to an intermediate position seen in FIG. 5 to start the formation of the dimple flange DF. When the pilot hole PH in sheet $S_N$ has been enlarged out to land diameter $d_3$, the collar locking surface 122 moves through the enlarged pilot hole as seen in FIG. 5. The gripping jaw assembly 311 continues to move the fastener 110 toward tool 310 which causes the secondary dimple bending surface 131 to engage the intermediately formed dimple flange DF in sheet $S_N$ and finish bending the dimple flange DF out to its final shape as seen in FIG. 6. When the fastener pin 110 is fully seated in the thusly formed dimple D, the swaging threshhold force on the collar 410 is exceeded and the anvil 314 starts swaging the collar 410 down around the locking surface 122 on the fastener pin 110. Finally, the collar 410 is fully swaged and the leading end of the anvil 314 engages the offside $S_{OOS}$ of the off sheet $S_o$ to stop the swaging operation as seen in FIG. 6.

The force exerted on the collar 410 as it is swaged is transferred to the breakneck section 136 which eventually fractures to release the pintail 114 and finally form the dimpled joint DJ seen in FIG. 7. The outside diameter $d_{15}$ of the swaged main body of collar 410 is about 0.200 inch (5.080 mm) corresponding to the passage diameter $d_{20}$ through anvil 314 while outside diameter $d_{16}$ of the swaged dimple flange 430 on collar 410 is about 0.3729 inch (9.472 mm) corresponding to the major diameter $d_{21}$ of the swaging surface 316 on anvil 314. Because the collar 410 has been firmly swaged into the locking groove 124 on surface 122, the collar 410 positively holds the fastener pin 110 in place.

Figure 8:
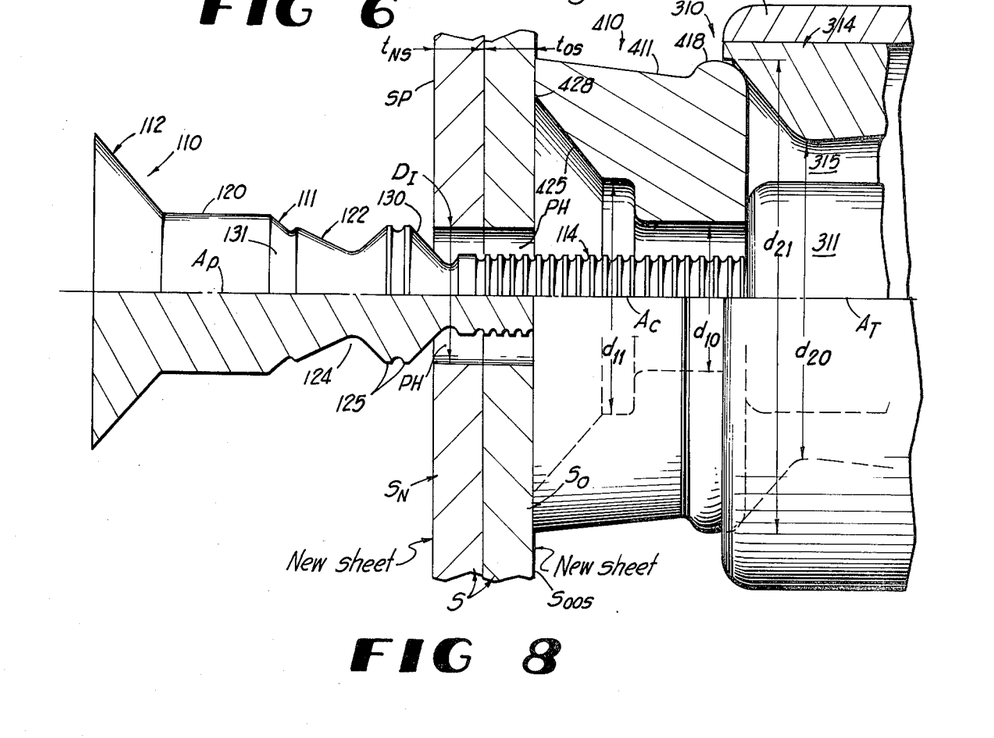
FIG. 8 is a view similar to FIG. 4 showing the fastener pin ready for installation in a new construction installation.
Figure 9:
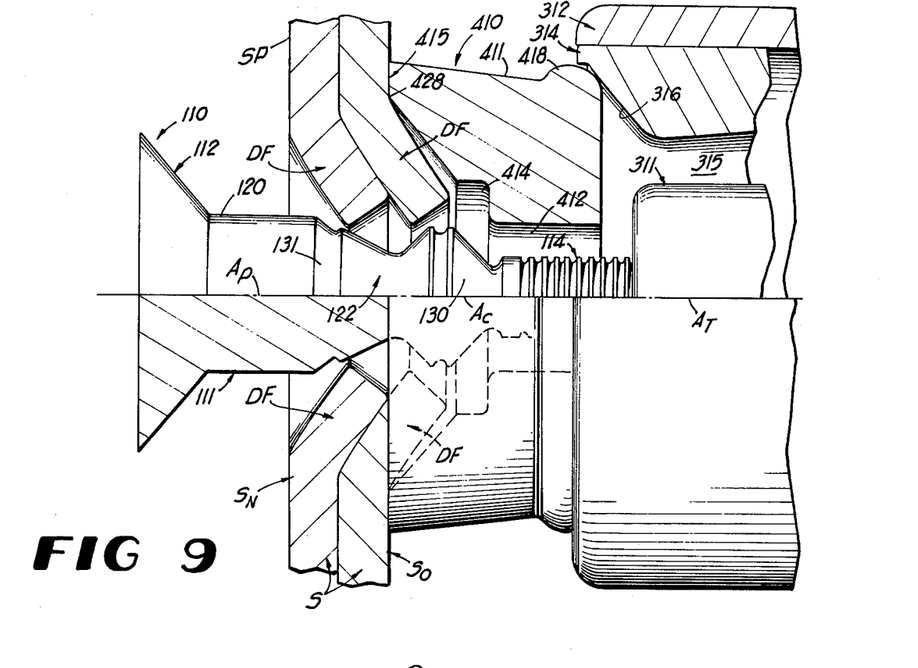
FIG. 9 is a view similar to FIG. 8 showing the fastener pin being pulled into the sheets of material.

FIGS. 8 and 9 correspond to FIGS. 4 and 5 but show the fastener pin 110, the collar 410, and the tool 310 being used in new construction where neither of the sheets S have a preformed dimple flange. As the fastener pin 110 is pulled from the position shown in FIG. 8 to the position shown in FIG. 9, the primary dimple bending surface 130 on fastener pin 110 bends both sheets S to the intermediate position seen in FIG. 9 to start the formation of the dimple flanges DF in both sheets S. The secondary dimple bending surface 131 then bends both dimple flanges DF to their final position and the collar 410 is swaged as seen in FIG. 6. The breakneck section 136 is then fractured as seen in FIG. 7 to complete the joint.

FIGS. 10–14 illustrate the fastener pin 110 being used with the dual action tool 510 and dual action collar 610. The pilot hole diameter $D_I$ is the same since the fastener pin 110 is being used. The anvil passage diameter $d_{50}$ in the nosepiece 512 is about 0.313 inch (7.938 mm) to regulate the outside dimple diameter $d_{OOD}$. The collar passage diameter $d_{51}$ is about 0.200 inch (5.080 mm) since it forms the swaged main body diameter $d_{15}$ of collar 610. The swaging surface major diameter $d_{52}$ is about 0.312 inch (7.925 mm) to permit the anvil 518 to slide in nosepiece 512. The pin passage diameter $d_{10}$ and the counterbore diameter $d_{11}$ in collar 610 remain the same as in collar 310, however, the outside diameter $d_{12}$ of collar 610 is about 0.250 inch (6.350 mm) since it must fit inside the anvil passage 514 in nosepiece 512 of tool 510.

Figure 10:
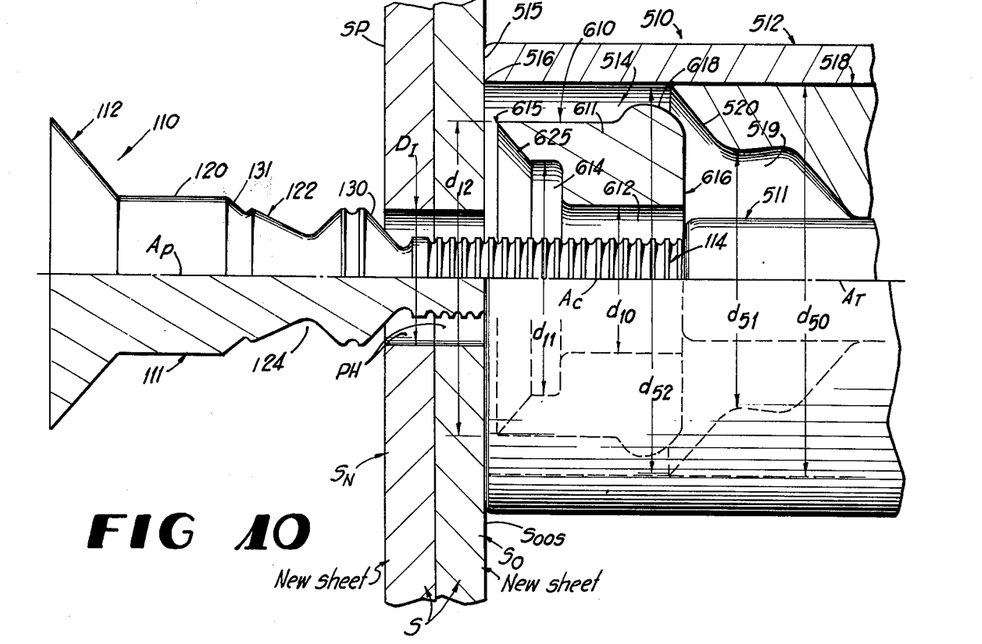
FIG. 10 is a view similar to FIG. 8 showing the fastener pin ready for installation using a second embodiment of the installation tool.

As seen in FIG. 10, the fastener pin 110 is inserted through pilot holes PH, the collar 610 positioned over pintail 114 and the tool 510 positioned over pintail 114 until the jaw assembly 511 engages pintail 114 and the sheet bearing surface 515 on the end of nosepiece 512 engages the offside $S_{OOS}$ of the off sheet $S_o$. It will be noted that anvil 518 is held in its retracted position so that collar 610 is free to move around in the passage 514 in nosepiece 512.

Figure 11:
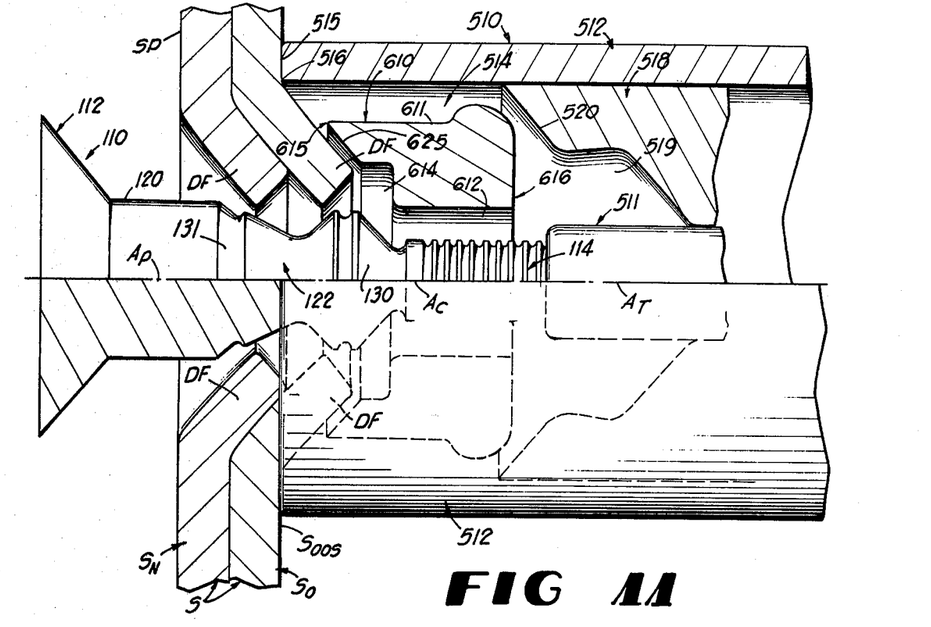
FIG. 11 is a view similar to FIG. 10 showing the fastener pin being pulled into the sheets of material.

The pulling jaw assembly 511 is then activated to pull the fastener pin 110 into the pilot holes PH while the nosepiece 512 bears against the sheet $S_o$. As the primary dimple bending surface 130 passes through holes PH, it deforms the sheets S to start the formation of the dimple flanges DF as seen in FIG. 11 where flanges DF have been formed in an intermediate position. The anvil 518 is still held in its retracted position and the collar 110 is free floating in passage 514 in nosepiece 512.

The pulling jaw assembly 511 continues to pull fastener pin 110 into the sheets S so that the secondary dimple bending surface 131 bends flanges DF to their final position seen in FIG. 12. As soon as the head 112 is seated in the thusly formed dimple, the anvil 518 is activated and moves toward the sheet $S_o$. Thus, the collar 610 is moved thereby until the dimple bearing surface 625 engages the offside of the dimple flange DF on the off sheet $S_o$ as seen in FIG. 12 to make sure that the dimple flanges DF are properly formed.

Figure 13:
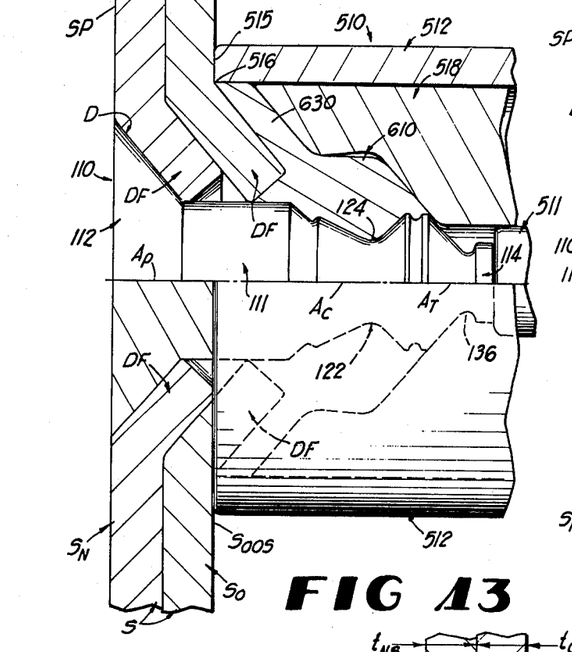
FIG. 13 is a view similar to FIG. 12 showing the collar swaged onto the fastener pin.
Figure 14:
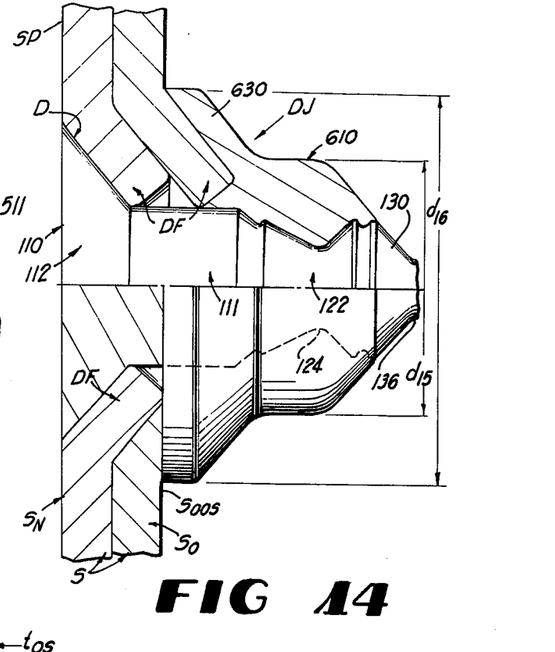
FIG. 14 is a view similar to FIG. 13 showing the fastener joint completed.

As anvil 518 continues to move toward the sheet $S_o$, the swaging force threshhold of collar 610 is exceeded and collar 610 is swaged down around the locking surface 122 on fastener pin 110 as seen in FIG. 13. This also forms the dimple support flange 630. When anvil 518 engages the surface 130 on fastener pin 110, the collar 610 is fully swaged as seen in FIG. 13. This transfers the pulling force to the breakneck section 136 in fastener pin 110 and eventually causes it to fracture to separate pintail 114 and produce the finished dimple joint DJ seen in FIG. 14. The finally swaged collar 610 has a main body outside diameter $d_{15}$ of about 0.200 inch (5.080 mm) as set by collar passage 519 in anvil 518 and a swaged dimple flange outside diameter $d_{16}$ of about 0.313 inch (7.938 mm) as set by the anvil passage 514 in nosepiece 512.

FIGS. 15-18 illustrate the installation of the sheet lock fastener pin 210. As an example the fastener pin 210 is also illustrated as a ⅛ inch fastener. As seen in FIG. 3, diameters $d_1$, $d_2$, $d_5$ and $d_6$ of fastener pin 210 correspond to like diameters of fastener pin 110. Similarly, the grip length $L_G$ and pintail length $L_P$ of fastener pin 210 correspond to those of fastener pin 110. The first major shank diameter $d_8$ is about 0.167 inch (4.234 mm) and the second major shank diameter $d_9$ is about 0.179 inch (4.552 mm) where the sheet thicknesses $t_{NS}$ and $t_{OS}$ are each about 0.0417 inch (1.058 mm). Diameters $d_8$ and $d_9$, of course, will change for different sheet thicknesses. The near sheet end subsurface length $L_{NES}$ is about 0.0417 inch (1.058 mm), the off sheet side subsurface length $L_{OSS}$ is about 0.0313 inch (0.794 mm), and the off sheet end subsurface length $L_{OES}$ is about 0.0458 inch (1.163 mm). Lengths $L_{NES}$, $L_{OSS}$ and $L_{OES}$ would also change with changes in sheet thickness. As seen in FIG. 15, the pilot hole diameter $D_I$ is about 0.100, the same as for fastener pin 110. The anvil passage diameter $d_{70}$ is about 0.313 inch (7.938 mm) so that the dimple diameter $d_{OOD}$ will be correct. The pin passage diameter $d_{71}$ through anvil 718 is about 0.182 inch (4.623 mm) to clear the second major shank diameter $d_9$ on the fastener pin 210 during the final installation of the fastener pin 210. The outside diameter $d_{72}$ of the reforming surface 720 on anvil 718 is about 0.312 inch (7.925 mm) to permit anvil 718 to slide in nosepiece 712.

As seen in FIG. 15, the fastener pin 210 is inserted through pilot holes PH and the tool 710 positioned over the pintail 214 until the jaw assembly 711 engages pintail 214 and the sheet bearing surface 715 on the end of nosepiece 712 engages the offside $S_{OOS}$ of the off sheet $S_o$. It will be noted that anvil 718 is held in its retracted position as will become more apparent. The pulling jaw assembly 711 is then activated to pull the fastener pin 210 into the pilot holes PH while the nosepiece 712 bears against the sheet $S_o$. As the dimple bending surface 230 passes through holes PH, it deforms the sheets S to start the formation of the dimple flanges DF as seen in FIG. 16 by bending flanges DF past their final position to the overexpanded diameter $d_{ID}$ of about 0.179 inch (4.552 mm) so that the major shank diameters $d_9$ and $d_8$ can pass therethrough. The anvil 718 is still held in its retracted position to allow the dimple flanges DF to be bent to their expanded position seen in FIG. 16.

The pulling jaw assembly 711 continues to pull fastener pin 210 into the sheets S until the head 212 is seated. As soon as the head 112 is seated in the thusly formed dimple, the anvil 718 is activated and moves toward the sheet $S_o$. When the reforming surface 720 on anvil 718 engages the offside of the overformed dimple flange DF on the off sheet $S_o$ as seen in FIG. 17, it presses the dimple flanges DF back to their final positions. This causes the dimple flange DF on the near sheet $S_N$ to be seated in groove $218_N$ engaging the head bearing surface 216 and the near end subsurface 219. The dimple flange DF on the off sheet $S_o$ is seated in groove $218_O$ at the same time engaging the off sheet side subsurface 220 and the off sheet end subsurface 221. The fastener pin 210 is now firmly locked in the sheets S by dimple flanges DF as seen in FIG. 17. The pulling force is now transferred to the breakneck section 236 in fastener pin 210 and eventually causes it to fracture to separate pintail 114 and produce the finished dimple joint DJ seen in FIG. 18.

I claim:
1. A self-dimpling fastener pin with a common pin central axis for use in forming dimpled fastener joints connecting thin sheets of material having aligned fastener holes of an initial hole diameter therethrough comprising:

a shank; a head integral with one end of said shank; and, a pintail integral with the opposite end of said shank with said shank, head and pintail coaxial with each other and concentric about the pin central axis, said head defining a tapered head bearing surface on the underside thereof facing said shank concentric about the pin central axis and having a size and shape corresponding to the desired size and shape of the dimple in the sheets of material when installation of the fastener pin is complete, said shank defining a shank bearing surface thereon which joins with said head bearing surface, said shank bearing surface concentric about the pin central axis and having a minimum outside diameter larger than the initial hole diameter and corresponding to the diameter of the holes through the sheets of material when installation of the fastener pin is complete, said pintail defining a gripping surface thereon adapted to be gripped to pull the fastener pin into the holes through the sheets of material, pintail first, said pintail having a maximum outside gripping diameter smaller than the initial hole diameter so that said gripping surface on said pintail will slidably pass through the holes in the sheets of material prior to the formation of the dimple therein, and, said fastener pin further defining at least one tapered dimple bending surface thereon facing and trailing said gripping surface on said pintail and leading said shank bearing surface having a size and shape such that said dimple bending surface will bend the sheets of material to form the dimple therein as the fastener pin is pulled into the holes, pintail first, until said head bearing surface is in bearing contact with the sheets of material in the thusly bent dimple.

2. The fastener pin of claim 1 wherein said bearing surface on said shank includes a plurality of sheet locking grooves, one of said sheet locking grooves being provided for each sheet of material connected at the fastener joint, each of said sheet locking grooves having a size and configuration to support one of the sheets of material about the hole therethrough after formation of the dimple in the sheet of material so that each sheet of material, through the dimple formed therein, retains the fastener pin in position through engagement with said sheet locking groove.

3. The fastener pin of claim 1 wherein said shank defines said tapered dimple bending surface thereon and wherein said pintail includes a reduced diameter frangible breakneck section connecting said pintail to said shank so that said breakneck section is broken after said head bearing surface on said head is seated in the dimple formed in the sheets of material to separate said pintail from said shank.

4. The fastener pin of claim 3 for use with a swagable locking collar wherein said shank defines a collar locking surface thereon leading said shank bearing surface, said collar locking surface having a major outside diameter smaller than the diameter of said shank bearing surface and a configuration such that the collar will grip said collar locking surface to lock the fastener pin in the sheets of material upon swaging the locking collar thereon.

5. In combination with the fastener pin of claim 1 wherein said shank defines a collar locking surface thereon leading said shank bearing surface; a swagable locking collar having a collar central axis and comprising an annular swagable collar side wall having a bearing end adapted to bear against the sheets of material on that side of the sheets of material opposite said head on the fastener pin and a driven end opposite the bearing end, said collar side wall defining an initial pin passage therethrough having a size sufficient to allow the unswaged collar to be slidably received over said pintail and said collar locking surface on said shank, said collar defining an annular tapered dimple bearing surface on the bearing end thereof having a configuration complimentary to the configuration of that sheet of material at the dimple against which the collar bears so that the dimple bearing surface supports the dimple in opposition to said head of the fastener pin, said collar locking surface on said shank of the fastener pin having a configuration such that the collar will grip said collar locking surface to lock the fastener pin in the sheets of material upon swaging of the locking collar thereon.

6. The fastener pin and collar combination of claim 5 wherein said collar side wall further defines an annular sheet bearing surface on the bearing end thereof normal to the collar central axis, said sheet bearing surface having an inside diameter complimentary to the outside diameter of the dimple to be formed in that sheet of material against which the collar bears so that the bending of the sheet of material as the fastener pin is installed is limited to that portion of the sheet of material between the inside of the sheet bearing surface on the collar and the hole through the sheet of material when the head of the fastener pin and the collar are forced toward each other with the collar central axis coaxial with the fastener pin central axis.

* * * * *